Patented Dec. 8, 1925.

1,564,214

UNITED STATES PATENT OFFICE.

CLARENCE G. DERICK, THOMAS H. LEAMING, AND WALTER M. RALPH, OF BUFFALO, NEW YORK, ASSIGNORS TO NATIONAL ANILINE & CHEMICAL CO., INC., OF NEW YORK, N. Y., A CORPORATION OF NEW YORK.

PRODUCTION OF M-AMINO-P-CRESOL-METHYL-ETHER.

No Drawing.   Application filed March 9, 1920.   Serial No. 364,428.

*To all whom it may concern:*

Be it known that we, CLARENCE G. DERICK, THOMAS H. LEAMING, and WALTER M. RALPH, citizens of the United States, residing at Buffalo, county of Erie, State of New York, have invented certain new and useful Improvements in the Production of m-Amino-p-Cresol-Methyl-Ether; and we do hereby declare the following to be a full, clear, and exact description of the invention, such as will enable others skilled in the art to which it appertains to make and use the same.

This invention relates to the production of m-amino-p-cresol methyl ether (4-methyl-2-amino-1-methoxy-benzene), from m-nitro-p-cresol, (4-methyl-2-nitrophenol).

In the production of m-nitro-p-cresol methyl ether from m-nitro-p-cresol, it has heretofore been proposed to convert the m-nitro-p-cresol into m-nitro-p-cresol methyl ether by introducing the silver salt of the m-nitro-p-cresol gradually into methyl iodide diluted with ether, removing the silver iodide by filtration, and the excess of methyl iodide an ether by distillation, and to recover the m-nitro-p-cresol methyl ether by steam distillation. It has also been proposed to heat the potassium salt of the nitro-cresol with excess of methyl iodide in a closed vessel for a long period of time and at an elevated temperature of about 140 to 150° C.

In the production of m-amino-p-cresol methyl ether from m-nitro-p-cresol methyl ether it has been proposed to effect the reduction of the nitro group to the amino group by means of tin and hydrochloric acid.

These prior proposals, however, are expensive and are not well adapted for use in the commercial production of m-amino-p-cresol methyl ether. The process of the present invention avoids the objections to these proposals, and enables the m-amino-p-cresol methyl ether to be produced from m-nitro-p-cresol in a simple and advantageous manner, and with good yield.

According to the present invention, the m-nitro-p-cresol is subjected to methylation to produce the nitro-cresol methyl ether, and the nitro-cresol methyl ether is then subjected to reduction to reduce the nitro group to the amino group. The methylation is effected by means of dimethyl sulfate and alkali; while the subsequent reduction is effected with sodium disulfide, or sulfur and sodium monosulfide.

The invention will be further illustrated by the following more detailed description of a specific example thereof, the parts being by weight:

500 parts of water, 150 parts of nitro-cresol, and 153 parts of dimethyl sulfate, are charged in the order mentioned into the reaction vessel, and a solution of 51 parts of caustic soda in water is then run in slowly, the temperature being maintained at about 40 to 50° C. Since the nitro-cresol, the dimethyl sulphate, and the nitro-cresol methyl ether are all immiscible with water, good agitation is essential throughout the methylation in order to accomplish a thorough mixing of the reacting substances. After the caustic is all run in, the mixture is permitted to interact for a certain time, e. g., about 2 hours, and it is then heated at 100° C. a sufficient time to destroy the excess of methyl sulfate. The alkalinity of the solution should be maintained during the methylation.

The methylation can take place in the presence of varying amounts of water. Sufficient water should be present to facilitate the operations, while large quantities of water present no advantage and are rather a disadvantage since they require the handling of larger volumes. The quantity of caustic soda should be sufficient to decompose all of the dimethyl sulfate used. The quantity of dimethyl sulfate should be at least that theoretically required to effect the methylation, that is, 1 mol, but a slight excess is desirable of both the dimethyl sulfate and the caustic soda, for example, an excess of from 10 to 25%. Even molecular proportions or a very slight excess of the dimethyl sulfate may be sufficient, for example, 1 mol of the dimethyl sulfate and 1.10 mols of caustic soda.

An alternative method of effecting the methylation is to dissolve the nitrocresol in the requisite amount of dilute alkali, and gradually run in the dimethyl sulfate, while maintaining the temperature at around 40 to 50° C. and agitating thoroughly; although we regard this alternative method as less advantageous than that above described.

The kettle used for the methylation may advantageously be provided with a reflux condenser so arranged that it can be used as a straight condenser for distilling off any methyl alcohol that may result from any excess of dimethyl sulfate that may be used, or that may be formed from the sodium methyl sulfate.

After the methylation, the nitrocresol methyl ether is subjected to reduction to reduce the nitro group to the amino group. This reduction can advantageously be carried out in the same vessel used for the methylation and without isolation of the methyl ether. The hot mixture resulting from the methylation may thus be used without cooling, and the solid sodium sulfide (chip monosulfide) and sulfur gradually added with vigorous agitation, or a solution of the two as sodium disulfide may be added, the sulfide being so added that a constant and vigorous, but not a violent, reaction will take place. If the sodium disulfide is added too rapidly, the reaction becomes violent, and the contents of the kettle are apt to boil over. The sulfide should accordingly be added sufficiently slowly, or the kettle provided with sufficient cooling means, to prevent the reaction from becoming too vigorous. When the sulfide is all in, a sample is taken and subjected to steam distillation. If the temperature of solidification of the distillate indicates that the reduction is not complete, more sulfide is added, while still maintaining refluxing conditions, which are maintained during the entire reduction. When a sample of the product, upon steam distillation, shows the reduction to have proceeded far enough, the entire product is subjected to steam distillation and the aminocresol methyl ether thereby recovered. It should have a solidifying temperature of about 48 to 50° C.

The amount of sodium sulfide used can be somewhat varied, and materially less amounts than that above indicated may suffice. The amount of sodium disulfide (or of sodium monosulfide and sulfur) may thus be about 1.5 mols for each mol of the nitrocresol methyl ether to be reduced. A large excess of the sulfide may not be objectionable, but likewise presents no advantage.

The steam distillation of the aminocresol methyl ether may be effected from the same kettle used for the methylation and reduction, and making use of the same condenser used as a reflux condenser during the reduction.

The following specific example will further illustrate a somewhat modified form of the process of the invention, using somewhat decreased amounts of reagents. The parts are by weight:

200 parts of water are introduced into an iron kettle, 152 parts of nitrocresol added, and then 130 parts of dimethyl sulfate (100%). This mixture is subjected to vigorous agitation and 160 parts of 30° Bé. caustic soda are added. The caustic soda is run in slowly while maintaining the temperature at from 40 to 50° until a permanent brilliant yellow color is produced, and the temperature is maintained until the methylation is complete, when any small remaining excess of dimethyl sulfate is decomposed by heating in the manner above described.

While the solution is still hot, a solution of sodium disulfide is gradually added, with good agitation and refluxing. The sodium disulfide solution may be prepared, for example, from 1200 parts of sodium monosulfide (60% chips), 300 parts of sulfur, and 2000 parts of water, the formation of the solution being promoted by heating with steam. At the end of the reduction, the aminocresol methyl ether is steam distilled.

In the reduction of the nitrocresol methyl ether, it is of importance to add the sodium disulfide solution to the mixture containing the nitrocresol methyl ether, rather than the reverse, inasmuch as the sodium disulfide solution is of a practically homogenous character, while the nitrocresol methyl ether mixture is not homogeneous.

If some of the nitrocresol originally used escapes methylation, this will involve a corresponding loss in that the cresol ether will not be formed, but this unchanged nitrocresol will be reduced to amino cresol which will remain behind upon steam distillation of the alkaline solution of the aminocresol methyl ether.

If unreduced nitrocresol methyl ether is present after the reduction, this will steam distill with the aminocresol methyl ether, and its presence will lower the melting point of the product. The reduction should therefore be continued with sufficient of the sulfide until a product of appropriate melting point is produced, indicating that the nitro compound has been reduced to the amino compound with substantial completeness. A product melting at 45° C. has been found to be sufficiently pure for shipment or use; although the product may be further purified where a product of increased purity is required.

From the above description it will be seen that the nitrocresol used as the starting material is first subjected to methylation with dimethyl sulfate and alkali, while the nitrocresol methyl ether so formed is then subjected to reduction by the addition of the sodium disulfide. The reduction may advantageously follow the methylation, without isolation of the nitrocresol methyl ether, and taking advantage of the hot solution or mixture which is produced by the methylation.

Through the specification and claims it is understood that the term "m-nitro-p-cresol" means "4-methyl-2-nitro-phenol"; the term "m-nitro-p-cresol-methyl ether" means "4-methyl-2-nitro-1-methoxy-benzene," and the term "m-amino-p-cresol-methyl ether" refers to "4-methyl-2-amino-1-methoxy-benzene."

We claim:

1. The method of producing m-nitro-p-cresol methyl ether, which comprises gradually adding an aqueous caustic soda solution to a mixture of m-nitro-p-cresol and dimethyl sulfate in water at a temperature of about 40 to 50° C.

2. The method of producing m-amino-p-cresol methyl ether, which comprises subjecting m-nitro-p-cresol methyl ether in admixture with water to reduction by heating with sodium disulfide.

3. The method of producing m-amino-p-cresol methyl ether, which comprises subjecting m-nitro-p-cresol to methylation with dimethyl sulfate and alkali, and subjecting the m-nitro-p-cresol methyl ether thus produced while still hot to reduction by gradually adding a solution of sodium disulfide to the aqueous mixture resulting from the methylation.

4. The method of producing m-nitro-p-cresol methyl ether, which comprises subjecting m-nitro-p-cresol to methylation with dimethyl sulfate in the presence of caustic soda and at a regulated temperature of about 40 to 50° C.

5. The method of producing m-amino-p-cresol methyl ether which comprises subjecting an aqueous mixture of m-nitro-p-cresol methyl ether to reduction by gradually adding thereto a solution of sodium disulfide, with regulation of the rate of addition to obtain a vigorous but not violent reaction.

6. The method of producing m-amino-p-cresol methyl ether, which comprises subjecting m-nitro-p-cresol to methylation with dimethyl sulfate and alkali at a regulated temperature of about 40 to 50° C. and subjecting the hot aqueous mixture so produced to reduction by the gradual addition thereto of a solution of sodium disulfide, and finally recovering the m-amino-p-cresol methyl ether from the reduction product by steam distillation.

7. The method of producing m-nitro-p-cresol-methyl-ether, which comprises treating m-nitro-p-cresol with dimethyl sulfate in the presence of water and of sufficient aqueous caustic soda to maintain an alkaline reaction throughout the methylation, subjecting the mixture to agitation during the methylation, and maintaining a regulated temperature below that of boiling of the mixture.

8. The method of producing m-amino-p-cresol-methyl-ether, which comprises subjecting m-nitro-p-cresol to methylation in the presence of an excess of caustic soda, and subjecting the resulting mixture, while still hot, to reduction by adding thereto a sodium sulfide as a reducing agent, and finally recovering the m-amino-p-cresol-methyl-ether from the reduction mixture.

9. In a process of making m-nitro-p-cresol methyl ether by subjecting m-nitro-p-cresol to methylation by means of dimethyl sulfate, the step characterized by causing the reaction to occur in the presence of caustic soda in aqueous solution.

10. In a process of making m-nitro-p-cresol methyl ether by the action of dimethyl sulfate on m-nitro-p-cresol in the presence of caustic soda, the steps which comprise the gradual addition of the caustic soda to a mixture of m-nitro-p-cresol and dimethyl sulfate in the presence of water, and maintaining an alkaline reaction in the mixture during the methylation.

11. The method of producing m-nitro-p-cresol methyl ether, which comprises inducing a reaction between m-nitro-p-cresol and dimethyl sulfate in presence of water and caustic soda.

12. The method of producing m-nitro-p-cresol methyl ether, which comprises inducing an interaction between one mole each of m-nitro-p-cresol, dimethyl sulfate and caustic soda, in presence of water.

13. The method of producing m-amino-p-cresol methyl ether, which comprises subjecting m-nitro-p-cresol methyl ether to reduction with an alkali metal sulfide in the presence of water.

In testimony whereof, we affix our signatures.

CLARENCE G. DERICK.
THOMAS H. LEAMING.
WALTER M. RALPH.